March 1, 1949.　　　　C. M. SORVAAG　　　　2,463,436

BRIDGE FOR MEASUREMENT OF RADIO FREQUENCY POWER

Filed Feb. 27, 1945

INVENTOR.
CLARENCE M. SORVAAG
BY William D. Hall.
Attorney

Patented Mar. 1, 1949

2,463,436

UNITED STATES PATENT OFFICE 2,463,436

BRIDGE FOR MEASUREMENT OF RADIO-FREQUENCY POWER

Clarence M. Sorvaag, Cambridge, Mass., assignor, by mesne assignments, to the United States of America as represented by the Secretary of War Application February 27, 1945, Serial No. 580,017

1 Claim. (Cl. 171—95)

This invention relates in general to electrical circuits, for the measurement of electrical power and more especially to circuits for the measurement of power at radio frequencies.

Conventional wattmeters are ordinarily limited to the measurement of power at relatively low frequencies by their inherent inductance. One method of measuring radio-frequency (R-F) energy requires conversion of the desired quantity to a form that can be indicated by a meter-movement of the d'Arsonval type, as for example, in a thermo-couple R-F ammeter.

It is an object of this invention to provide a circuit employing a common readily available element for the conversion of the R-F energy into a form more readily measured. It is a further object to provide a simple, rapid method of recalibrating the circuit whenever it becomes necessary to replace the converting element.

Other objects and advantages of this invention will suggest themselves to those skilled in the art and will become apparent from the following description of the invention taken in connection with the accompanying drawing in which.

Figure 1:
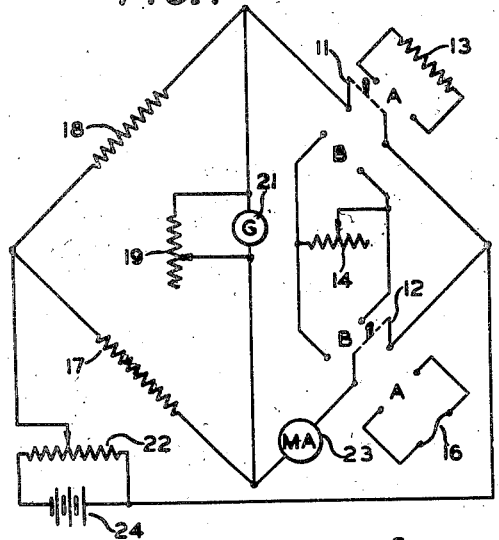
Fig. 1 is a schematic wiring diagram of this invention.

Referring now more particularly to Fig. 1, a bridge circuit is provided including resistance arms 17 and 18. The other two arms of the bridge include double-pole double-throw switches 11 and 12. Switch 11 may be used to connect either resistor 13 or variable resistor 14 in that arm. Switch 12 may be used to connect fuse 16 or variable resistor 14 in that arm of the circuit. The arm including switch 12 also includes a milliammeter 23. In the example being described, resistors 13, 17 and 18 may each have a value of 190 ohms.

The junction of the arm including resistor 18 and the arm including switch 11 is connected to the junction of the arm including resistor 17 and the arm including switch 12 by a branch including galvanometer 21 shunted by variable resistor 19. The other two corner junctions of the bridge are connected across a source of potential including battery 24 and potentiometer 22.

The fuse 16 is small and has a tungsten, platinum, or other metallic fusible element. This fuse is the element which converts R-F energy into a form measurable by the bridge.

Figure 2:
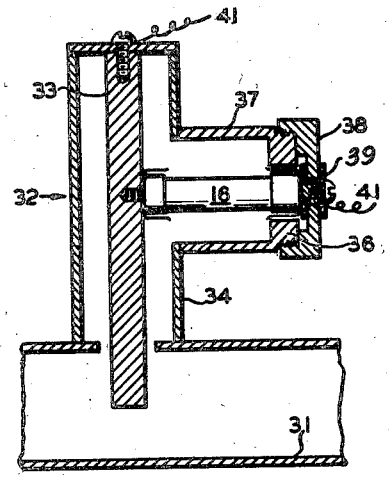
Fig. 2 shows one means for introducing R-F energy into the fuse.

Radio-frequency energy may be introduced into fuse 16 by any convenient means. Fig. 2 shows one method where element 31 is a wave guide from which energy is abstracted and element 32 is a short-circuited section of coaxial line containing inner conductor 33 which acts also as a probe in wave guide 31. Fuse 16 is coupled directly to inner conductor 33 and capacitively to outer conductor 34 of coaxial line 32 by the narrow section 36 of tube 37. Fuse 16 is insulated from removable cap 38 by insulating element 39. Direct-current connections to the bridge are made via wires 41.

In the operation of the circuit set forth in Fig. 1, switches 11 and 12 are placed in their respective positions A. The bridge will only balance when fuse 16 has a resistance equal to that of the other arms; in the example set forth, 190 ohms. As R-F energy is applied to fuse 16, that fuse will absorb energy and increase in temperature. The resistance of fuse 16 will increase with increase in temperature and this increase in resistance will result in unbalance of the bridge, indicated by a deflection of galvanometer 21.

Figure 3:
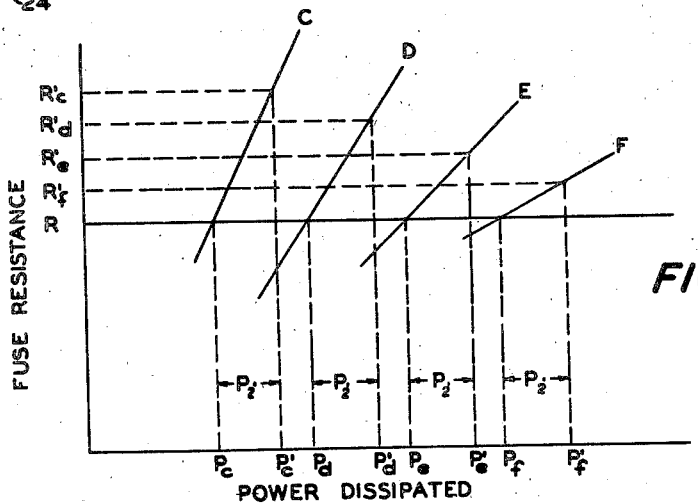
Fig. 3 is a graph showing the variation of resistance as a function of power dissipated for several representative samples of fuse.
Figure 4:
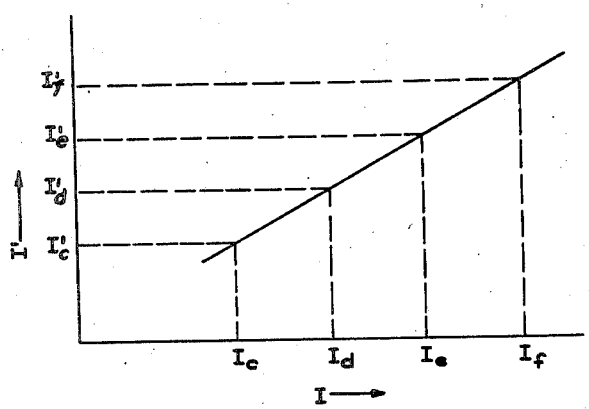
Fig. 4 is a graph derived from the graphs of Fig. 3 in a manner to be described.

To explain the method of calibrating the circuit, reference is made to the curves shown in Fig. 3 and Fig. 4. Curves C, D, E, and F in Fig. 3 show the variation of resistance of four random samples of fuse as a function of power dissipated. The data for these curves is obtained by measurement using direct current or low-frequency alternating current.

It is possible to select a value of resistance R which is attainable by each fuse represented, under the conditions of power dissipation indicated as $P_c$, $P_d$, $P_e$, and $P_f$ determined by the intersection of the line R with each curve C, D, E, and F. Corresponding values of current $I_c$, $I_d$, $I_e$, and $I_f$, for each fuse under this condition may be calculated from the relation $$I = \sqrt{\frac{P}{R}}$$

wherein all symbols have the meanings indicated above. If now the power dissipation in each fuse is increased by an increment $P_i$ as indicated in Fig. 3, the new values of total dissipated power $P_c'$, $P_d'$, $P_e'$, and $P_f'$ will determine new values of resistance $R_c'$, $R_d'$, $R_e'$, and $R_f'$, from which the corresponding values of current $I_c'$, $I_d'$, $I_e'$, and $I_f'$, may be calculated in the same manner as before.

In the embodiment of this invention here illustrated, the value of R is chosen equal to the resistance of resistors 13, 17, and 18, (190 ohms) and the increment of power $P_i$ is chosen equal to the desired full scale reading of galvanometer 21 or, in this example, 20 milliwatts.

The primed values of current may be plotted against the corresponding unprimed values to form another curve as shown in Fig. 4. In this curve the relation between I' and I is linear and single-valued. The operation of this invention does not depend upon the linearity of the curve, but only upon the fact of its being single-valued.

Fig. 4 is used as a calibration curve for the measuring circuit disclosed, the calibration process consisting of four steps. Referring again to Fig. 1, these steps are as follows:

(1) With switches 11 and 12 in their respective positions A, and with shunt 19 of galvanometer 21 set at maximum resistance, the bridge is brought to balance, as indicated by galvanometer 21, by adjustment of potentiometer 22. A value of current I is then obtained by reading milliammeter 23, which, when referred to the calibration curve of Fig. 4, yields a corresponding value of current I'.

(2) With switches 11 and 12 in positions B and A, respectively, potentiometer 22 and resistor 14 are so adjusted as to cause the value of I' as determined in step (1) to be indicated by milliammeter 23 simultaneously with balancing of the bridge.

(3) With switches 11 and 12 in their respective positions A, the bridge is again balanced by adjustment of potentiometer 22.

(4) With switches 11 and 12 in positions A and B, respectively, shunt resistor 19 is adjusted to obtain a deflection of galvanometer 21 corresponding to the increment of power used in obtaining the calibration curve.

For the measurement of power, switches 11 and 12 are closed in their respective positions A.

While there has been described what is at present considered to be the preferred embodiment of this invention, it will be obvious to those skilled in the art that various changes and modifications may be made therein without departing from the scope of the appended claim.

The invention claimed is:

A bridge circuit comprising a first arm including a resistance, a second arm including two-position switching means, said first arm and said second arm connected in series across a source of potential, a third arm including a resistance and a fourth arm including two-position switching means and a milliammeter, said third and fourth arms also connected in series and across said source of potential, an adjustable resistor, said switching means in said second arm arranged in one position to connect said adjustable resistor in said arm and in the other position to connect a fixed resistor in said arm, said switching means in said fourth arm arranged in one position to connect said adjustable resistor in said arm and in the other position to connect a resistor variable with temperature in said arm, a galvanometer with an adjustable shunt resistor connected between the junction of the first and second arms and the junction of the third and fourth arms.

CLARENCE M. SORVAAG.

REFERENCES CITED

The following references are of record in the file of this patent:

UNITED STATES PATENTS

| Number | Name | Date |
|---|---|---|
| 1,039,925 | Gati | Oct. 1, 1912 |
| 1,590,420 | Chubb | June 29, 1926 |
| 1,901,741 | Fetsch | Mar. 14, 1933 |